(12) United States Patent
Namiki et al.

(10) Patent No.: US 8,562,010 B2
(45) Date of Patent: *Oct. 22, 2013

(54) BODY STRUCTURE OF STRADDLE-RIDE VEHICLE

(75) Inventors: Hideo Namiki, Wako (JP); Kazuyoshi Kuroki, Wako (JP); Kenichi Misaki, Wako (JP); Sunao Kawano, Wako (JP); Hiroshi Furuse, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 674 days.

This patent is subject to a terminal disclaimer.

(21) Appl. No.: 12/719,023

(22) Filed: Mar. 8, 2010

(65) Prior Publication Data

US 2010/0244468 A1   Sep. 30, 2010

(30) Foreign Application Priority Data

Mar. 31, 2009   (JP) .................................. 2009-084394
Sep. 9, 2009    (JP) .................................. 2009-208642

(51) Int. Cl.
    *B62J 23/00*   (2006.01)
(52) U.S. Cl.
    USPC ..................... 280/160.1; 280/304.3; 280/770; 280/161; 280/162
(58) Field of Classification Search
    USPC .............. 280/770, 160, 160.1, 161, 162, 784, 280/304.3
    See application file for complete search history.

(56) References Cited

U.S. PATENT DOCUMENTS

| 1,941,801 A * | 1/1934 | Harley ...................... 280/304.3 |
| 3,902,740 A * | 9/1975 | Lucier et al. ............... 280/304.3 |
| 4,440,412 A * | 4/1984 | Kamiya ...................... 280/288.2 |
| 4,447,069 A * | 5/1984 | Winiecki et al. ............. 280/270 |
| 4,673,190 A * | 6/1987 | Ahlberg ..................... 280/304.3 |
| 5,106,136 A * | 4/1992 | Crain ......................... 293/105 |
| 5,368,516 A * | 11/1994 | Hoeting et al. .............. 446/288 |
| 6,286,867 B1 * | 9/2001 | Braemig et al. .............. 280/784 |

(Continued)

FOREIGN PATENT DOCUMENTS

| JP | 2001-082529 | 3/2001 |
| JP | 2002-264866 | 9/2002 |

(Continued)

OTHER PUBLICATIONS

European Search Report for corresponding European Application No. 10152914.7-2425, Jun. 8, 2010.

(Continued)

*Primary Examiner* — Katy M Ebner
(74) *Attorney, Agent, or Firm* — Ditthavong Mori & Steiner, P.C.

(57) ABSTRACT

A body structure of a straddle-ride vehicle includes a body frame, a handlebar, a front fork, a front wheel guide member, and an opposite cover. The handlebar is turnably provided on the body frame. The fork extends from the handlebar and rotatably supports a front wheel. The front wheel guide member is disposed at a front portion of the body frame in a traveling direction of the vehicle and faces the front wheel. The front wheel guide member includes a slant portion extending from one side to another side in a vehicle-width direction and from a front to a rear in the traveling direction. The opposite cover is supported by the front fork to cover a rear portion of the front wheel and faces the front wheel guide member.

16 Claims, 13 Drawing Sheets

(56) References Cited

U.S. PATENT DOCUMENTS

| | | | |
|---|---|---|---|
| 6,364,358 B1* | 4/2002 | Miller | 280/784 |
| 6,419,039 B1* | 7/2002 | Wagner | 180/219 |
| 6,511,119 B2* | 1/2003 | Takase et al. | 296/187.09 |
| 6,557,876 B2* | 5/2003 | Saiki et al. | 280/152.1 |
| 6,637,763 B2* | 10/2003 | Kuo | 280/209 |
| 6,758,484 B1* | 7/2004 | Rice | 280/304.4 |
| 6,764,099 B2* | 7/2004 | Akiyama et al. | 280/784 |
| 7,204,355 B2* | 4/2007 | Akiyama et al. | 188/371 |
| 7,967,337 B2* | 6/2011 | Misaki et al. | 280/781 |
| 2006/0163839 A1 | 7/2006 | Savage et al. | |
| 2007/0209855 A1* | 9/2007 | Burkiewicz | 180/223 |
| 2008/0023954 A1* | 1/2008 | Eichberger et al. | 280/784 |

FOREIGN PATENT DOCUMENTS

| | | |
|---|---|---|
| JP | 2005-088659 | 4/2005 |
| JP | 2007-269271 | 10/2007 |
| JP | 2008-080882 | 4/2008 |

OTHER PUBLICATIONS

Japanese Office Action for corresponding JP Application No. 2009-208642, Apr. 26, 2013.

* cited by examiner

BODY STRUCTURE OF STRADDLE-RIDE VEHICLE

CROSS-REFERENCE TO RELATED APPLICATIONS

The present application claims priority under 35 U.S.C. §119 to Japanese Patent Application No. 2009-084394, filed Mar. 31, 2009 and Japanese Patent Application No. 2009-208642, filed Sep. 9, 2009. The contents of these applications are incorporated herein by reference in their entirety.

BACKGROUND OF THE INVENTION

1. Field of the Invention

The present invention relates to a body structure of a straddle-ride vehicle.

2. Discussion of the Background

In general, a space is provided between a body frame and a front wheel in a motorcycle. This space is adapted to be able to absorb force from front by shifting the front wheel rearward when the front wheel undergoes an unexpected excessive force.

However, the effect that the space absorbs the force from front is a secondary one. Therefore, if the force from front is further excessively large, the front wheel causes interference with the body frame. Thus, there is concern about a pitching phenomenon (hereinafter also referred to pitching) which is a rear wheel uplifting phenomenon.

For example, Japanese Patent Application Publication (KOKAI) No. 2001-82529 discloses the invention, "a suspension device of a motorcycle or the like." Specifically, Japanese Patent Application Publication (KOKAI) No. 2001-82529 discloses a suspension device of a motorcycle or the like provided with a hydraulic damper that controls the air reaction force of a front fork to keep the gravity center of a body vehicle constant.

Japanese Patent Application Publication (KOKAI) No. 2007-269271 discloses the invention, "a shock-absorbing device-equipped vehicle and a bumper-equipped vehicle." Specifically, Japanese Patent Application Publication (KOKAI) No. 2007-269271 discloses a technical concept in which a shock-absorbing device capable of absorbing a collision load exerted on a small-sized vehicle is mounted on the vehicle.

Japanese Patent Application Publication (KOKAI) No. 2008-80882 discloses the invention, "a front wheel suspension device." Specifically, Japanese Patent Application Publication (KOKAI) No. 2008-80882 discloses a front wheel suspension device that suppresses pitching by lifting the front portion of a vehicle body at the time of an excessive load.

Japanese Patent Application Publication (KOKAI) No. 2002-264866 discloses the invention, "a front structure of a motorcycle." Specifically, Japanese Patent Application Publication (KOKAI) No. 2002-264866 discloses a technical concept in which a front portion of a body frame located rearward of a front wheel is formed like the bow of a ship or a bow-like member is attached to the front portion of the vehicle frame. In this case, the leading end of the bow is made offset toward any one of the left and right from the centerline of a front wheel-width direction encountered when the front wheel is kept in a straight-ahead state. Thus, at the time of an excessive load, the steering of the front wheel is promoted to suppress pitching.

However, the suspension structure in which the special pitching-suppression structure is attached to the front fork portion or in which the gravity center of the vehicle body is lowered is structurally complicated and arranges heavy members around the front wheel. This requires advanced control in the weight distribution of a vehicle. Thus, also costs tend to increase.

If the bow-like structure is provided at the front of the vehicle, when a tire undergoes force from front, it is elastically deformed because of an elastic body and then the steering of the vehicle is started. Thus, the delay of the steering occurs. In addition, since the tire has a large friction coefficient, depending on the steering angle of a handlebar encountered when the tire undergoes force from front, the steering becomes moderate. Thus, to promote rapid and reliable steering, it is necessary to introduce an additional technical concept.

SUMMARY OF THE INVENTION

According to one aspect of the present invention, a body structure of a straddle-ride vehicle includes a body frame, a handlebar, a front fork, a front wheel guide member, and an opposite cover. The handlebar is turnably provided on the body frame. The fork extends from the handlebar and rotatably supports a front wheel. The front wheel guide member is disposed at a front portion of the body frame in a traveling direction of the vehicle and faces the front wheel. The front wheel guide member includes a slant portion extending from one side to another side in a vehicle-width direction and from a front to a rear in the traveling direction. The opposite cover is supported by the front fork to cover a rear portion of the front wheel and faces the front wheel guide member.

According to another aspect of the present invention, a body structure of a straddle-ride vehicle includes a body frame, a handlebar, a front fork, and a front wheel guide member. The handlebar is turnably provided on the body frame. The front fork extends from the handlebar and rotatably supports a front wheel. The front wheel guide member is disposed at a front portion of the body frame in a traveling direction of the vehicle and faces the front wheel. The front wheel guide member is pivotally supported on one side in a vehicle-width direction so as to be swingable in a back and forth direction, and includes a guide surface extending in the vehicle-width direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
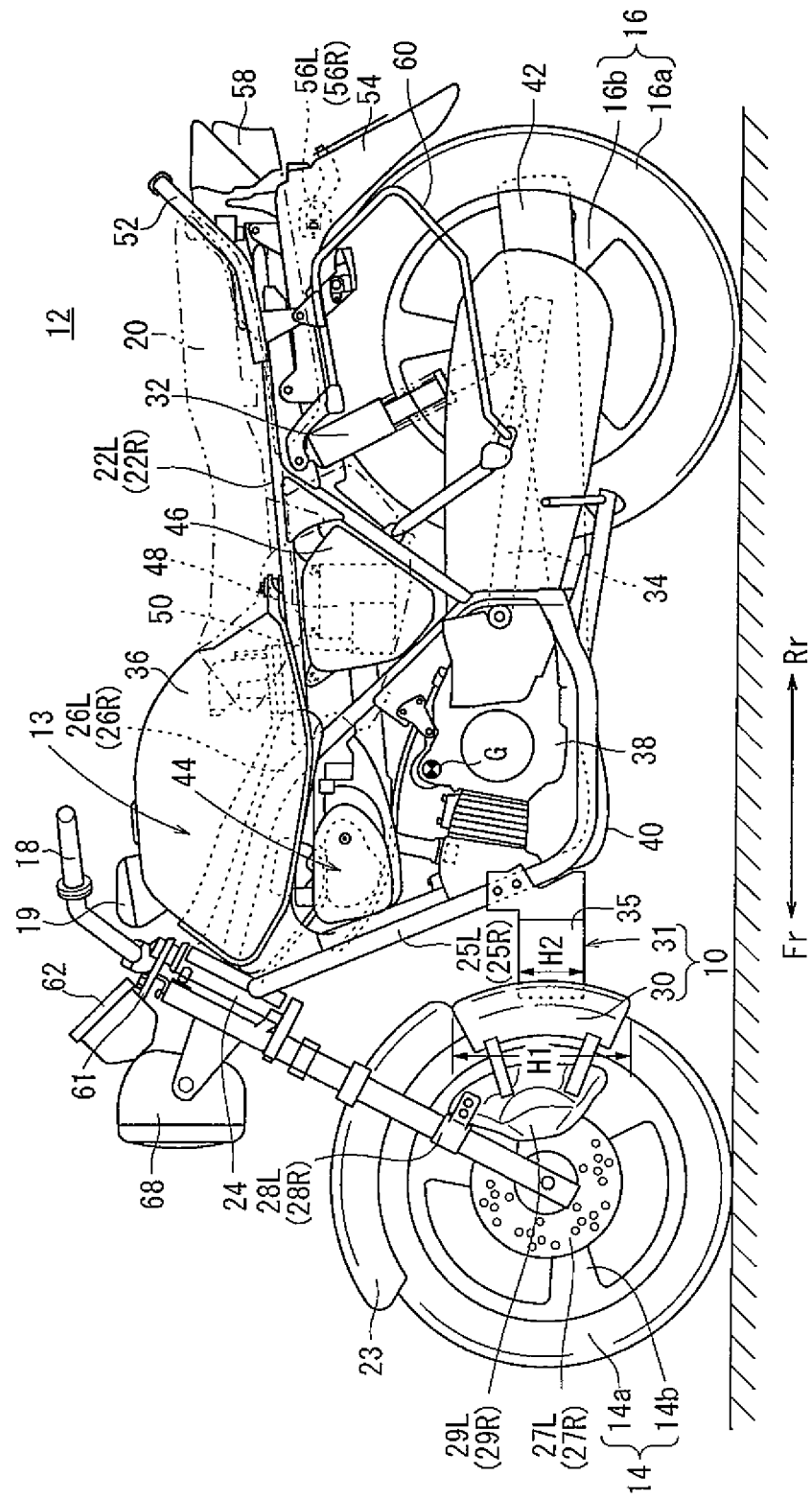
FIG. 1 is a partially-omitted lateral view of a motorcycle which is one of straddle-ride type vehicles incorporating a body structure according to a first embodiment of the present invention.

The embodiments will now be described with reference to the accompanying drawings, wherein like reference numerals designate corresponding or identical elements throughout the various drawings.

A detailed description will hereinafter be given of a body structure of a straddle-type vehicle pertaining to the present invention with reference to the accompanying drawings while taking embodiments in relation to a motorcycle which is the straddle-ride vehicle to which the body structure is applied.

First Embodiment

FIG. 1 is a lateral view of a motorcycle 12 incorporating a body structure 10 of the motorcycle (also called the body structure 10) according to a first embodiment of the present invention. The embodiment of the present invention is described by application to the motorcycle 12 by way of example. However, the invention is not limited to this but can be applied to straddle-ride type vehicles of various types (including a scooter type, on-road type, and off-road type).

Incidentally, in the motorcycle 12, mechanisms or constituent elements provided symmetrically, i.e., right and left, one by one on a vehicle body are such that left and right ones are attached with reference symbols "L" and "R," respectively. For easy understanding, a description is given in each drawing by attaching symbol "Fr" to an arrow indicating the front of the vehicle body and symbol "Rr" to an arrow indicating the rear of the vehicle body on the basis of a direction a sitting driver looks.

Referring to FIG. 1, the motorcycle 12 includes a cradle-type body frame 13 constituting the vehicle body; a front wheel 14 which is a steering wheel; a rear wheel 16 which is a drive wheel; a handlebar 18 adapted to steer the front wheel 14; and a seat 20 on which a passenger sits. The seat 20 is mounted via attachment support portions (not shown) on seat rails 22L, 22R extending from the body frame 13 toward the rear of the vehicle body. The front wheel 14 is composed of a tire 14a and a wheel 14b and the rear wheel 16 is composed of a tire 16a and a wheel 16b.

The body frame 13 is such that a head pipe 24 steerably supporting the handlebar 18, symmetrical down frames 25L, 25R and upper frames 26L, 26R define a cradle space. The body frame 13 may be of a diamond type or other types. As known in the art, an engine per se doubles as part of the frame as a reinforcing member in some cases.

In the front portion of the vehicle body, the head pipe 24 is pivotally supported below the handlebar 18 and the front forks 28L, 28R are pivotally supported on the lower end side of the head pipe 24. The front forks 28L, 28R rotatably support the wheel 14b.

A disk brake composed of brake rotors 27L, 27R and brake calipers 29L, 29R is disposed on the front wheel 14. The brake rotors 27L and 27R are supported by the front forks 28L and 28R, respectively, and connected to a brake lever (not shown) attached to a grip portion of the handlebar 18.

A front fender 23 is attached to the front forks 28L, 28R to cover the front wheel 14 from above. An opposite cover 30 is attached to cover the front wheel 14 from the side of the body frame 13. The opposite cover 30 is attached at a position lower than the gravity center G of the motorcycle 12 and composed of a cover portion 30a and two pairs of left and right support arms 30b supporting the cover portion 30a. In this case, the opposite cover 30 is made of a hard member lower in friction coefficient than the tire 14a, e.g., of a metal member such as a steel plate or the like. In addition, the opposite cover 30 is semi-circular in cross-section and has a circular shape of approximately 40 degrees (preferably 30 to 50 degrees) as viewed from the side. The support arm 30b is made of a metal member thinner than the cover portion 30a. In addition, the support arm 30b is supported by the brake calipers 29L, 29R. The support arm 30b suffices if it has such strength not to vibrate during traveling, that is, it is formed moderately weak. For this reason, the support arm 30b may be formed using a metal material softer than the cover portion 30a. The opposite cover 30 illustrated in FIG. 1 is provided only on the side of the body frame 13. However, the front fender 23 and the opposite cover 30 may be formed integrally with each other by allowing the opposite cover 30 to extend above the wheel. Alternatively, the front fender 23 and the opposite cover 30 may be made to have continuous design.

On the other hand, in the rear portion of the vehicle body, a swing arm 34 suspended by a rear cushion 32 at the rear portion of the body frame 13 is disposed below the seat 20. The tire 16a is rotatably supported by the swing arm 34.

A fuel tank 36 is mounted on the upper portion of the body frame 13 at a position between the handlebar 18 and the seat 20 and closer to the seat 20. An airbag 19 is disposed at a front portion of the fuel tank 36. For example, a four-cycle engine 38 is disposed in the cradle space of the body frame 13 below the fuel tank 36. A silencer (muffler) 42 is disposed in the rear portion of the vehicle body via an exhaust pipe 40 connected to an exhaust port of the engine 38. An air chamber 44 adapted to house an air cleaner, not shown, and the like is provided below the fuel tank 36 and above the engine 38.

A battery 48 and an ECU (engine control ECU) 50 are juxtaposed to each other below between the fuel tank 36 and the seat 20 and in a space covered by the cover 46. The ECU 50 is a control unit for exercising FI (fuel injection) control of the engine 38, control of various electrical components, fuel consumption calculation and display control, etc.

In the rearward of the cover 46, a U-shaped grip bar 52 is connected to the seat rails 22L, 22R and extends obliquely upward from the rear portions thereof. A rear fender 54 is disposed below the seat 20. Turn signal lamps 56L, 56R are disposed on the rear fender 54. A tail light 58 is attached to an upper portion of the rear fender 54. A guard cover 60 is attached forward of the rear fender 54.

A meter unit (display device) 62 is disposed via a bracket 61 above the head pipe 24 and forward of the handlebar 18 at a position a rider easily visibly recognizes. A headlight 68 is disposed below the meter unit 62 and forward of the handlebar 18 at a generally central portion.

Figure 2:
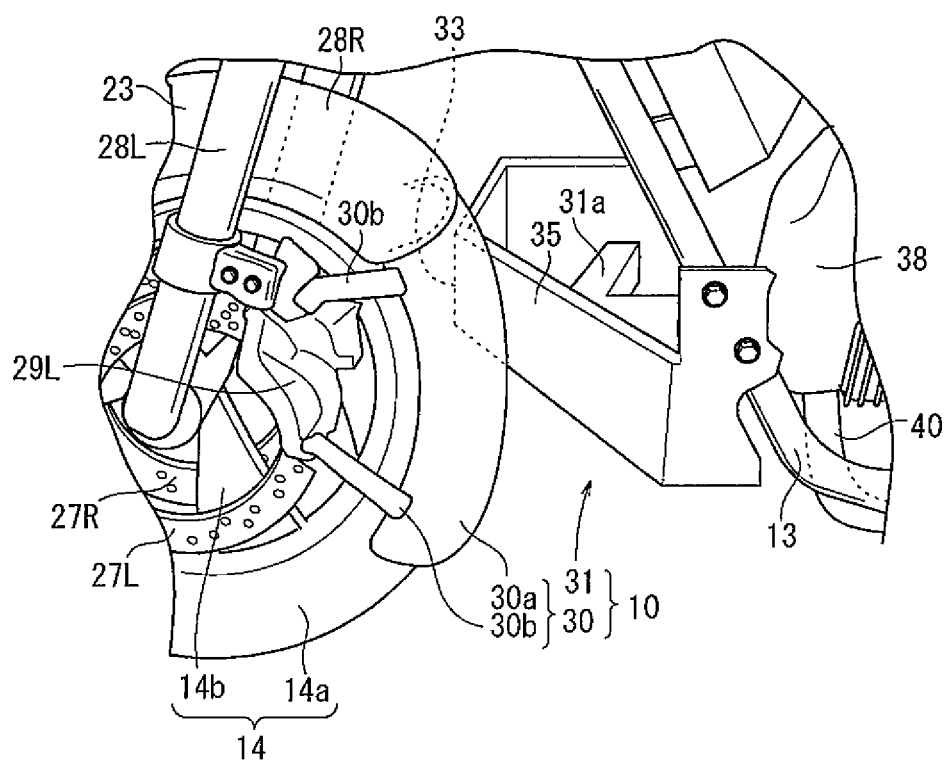
FIG. 2 is a partially-omitted enlarged perspective view of the body structure and its periphery according to the first embodiment of the present invention.

Referring to FIG. 2, a steering plate (front wheel guide member) 31 is disposed forward of the down frames 25L, 25R at a position facing the opposite cover 30.

The steering plate 31 is disposed at a position lower than the gravity center G of the motorcycle 12 and includes a front top portion 33 displaced rightward from the central portion and a slant surface (slant portion) extending rearward and leftward from the front top portion 33. The steering plate 31 is a thick and high-strong member and further is reinforced by a reinforcing portion 31a in order to hold the slant surface 35 even if a force is applied thereto from the front of the vehicle.

Now, if it is assumed that a vehicle height-directional width of the opposite cover 30 is H1 and a vehicle height-directional width of the steering plate 31 is H2, the relationship between H1 and H2 is such that H1>H2.

The front top portion 33 is displaced to a position where the steering of the front wheel is promoted in the same direction even if a force is applied to the vehicle from the front thereof when the front wheel 14 is steered at a maximum angle.

The motorcycle 12, the straddle-ride type vehicle, including the body structure 10 according to the embodiment is basically configured as described above and a description is next given of the function and effect thereof.

Figure 3:
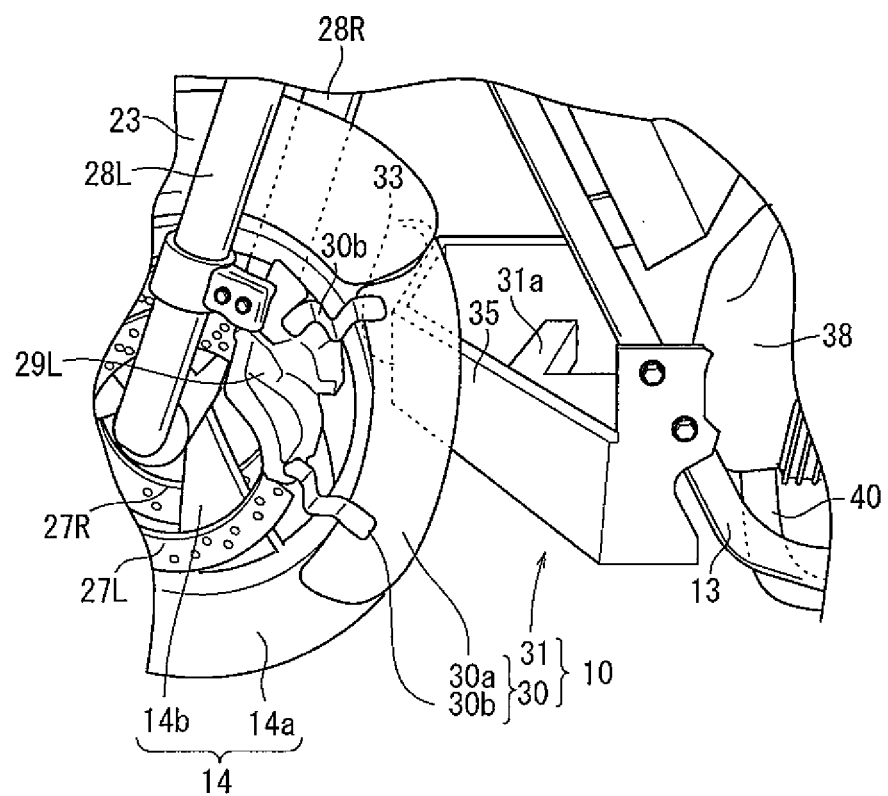
FIG. 3 is a partially-omitted enlarged perspective view of the body structure and its periphery according to the first embodiment of the present invention in a state immediately after the body structure undergoes a force from a front.
Figure 4A:
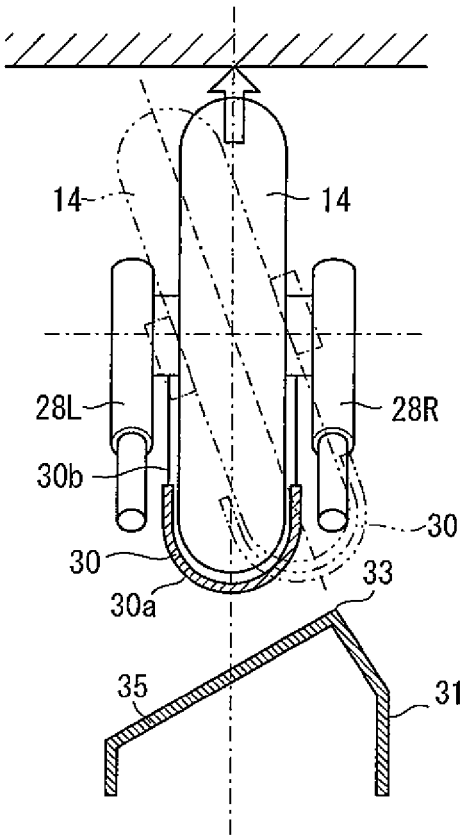
FIG. 4A is a schematic explanatory diagram illustrating a state immediately before the motorcycle will undergo a force from the front, the motorcycle incorporating the body structure of the first embodiment of the invention.
Figure 4B:
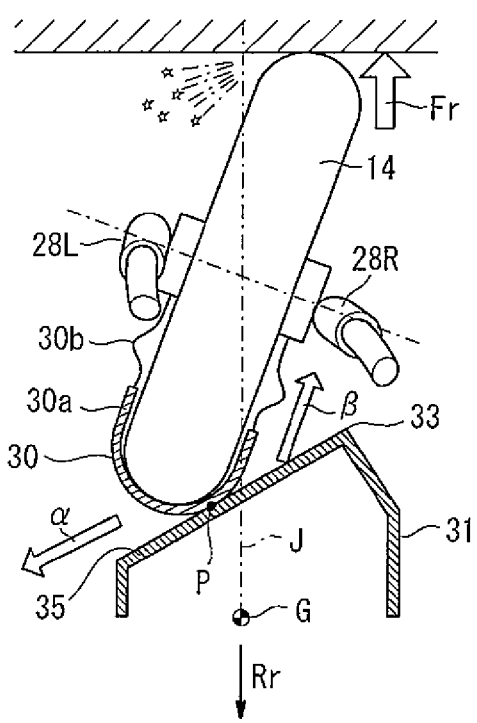
FIG. 4B is a schematic explanatory diagram illustrating a state immediately after the motorcycle has undergone a force from the front, the motorcycle incorporating the body structure of the first embodiment of the invention.

FIG. 3 illustrates the body structure 10 of the embodiment of the invention encountered immediately after it has collided with some obstruction. FIGS. 4A and 4B are schematic explanatory views of the motorcycle 12 subjected to a force from the front. FIG. 4A illustrates a state immediately before the motorcycle 12 will collide with some obstruction and FIG. 4B illustrates a state immediately after the motorcycle 12 has collided with some obstruction.

For example, if it is assumed that the front wheel 14 collided with some obstruction, the front wheel 14 undergoes a reaction force of a propulsion force, of the motorcycle 12, indicated with an arrow of FIG. 4A. Then, the reaction force applied to the front wheel 14 bends the front forks 28L, 28R and the head pipe 24 toward the body frame 13.

In this case, if the reaction force is so large as to exceed yield stress of the front forks 28L, 28R or the head pipe 24, the front forks 28L, 28R or the head pipe 24 is plastically deformed and the opposite cover 30 which is a projecting portion collides with the steering plate 31 provided forward of the body frame 13. At this time, since the support arms 30b of the opposite arm 30 is deformed, the cover portion 30a comes into contact with the tire 14a while remaining in almost the same shape.

In this case, since the cover portion 30a is at an approximate 40 degrees as viewed from the side, it covers the wide range of the tire 14a. Therefore, the tire 14a is not largely deformed. Thus, time-delay resulting from the deformation of the tire 14a will not occur. In addition, the cover portion 30a is such that the generally central portion in the height direction faces the slant surface 35 of the steering plate 31. Thus, the opposite cover 30 is pressed by the steering plate 31 in a balanced manner.

Since the cover portion 30a is appropriately longer than the slant surface 35 in a height direction (H1>H2), it comes into contact with the steering plate 31 even if the front forks 28L, 28R sink due to braking operation.

Thereafter, while remaining in contact with the tire 14a, the cover portion 30a slidably contacts the slant surface 35 of the steering plate 31 according to the deformation of the front forks 28L, 28R or the head pipe 24. The cover portion 30a is quickly and reliably displaced leftward rearward of the vehicle (an arrow α direction of FIG. 4B) while maintaining the integrated state of the front wheel 14 with the opposite cover 30.

In other words, the cover portion 30a of the opposite cover 30 is adequately hard and has a wide area and its height-directional central portion is pressed by the steering plate 31; therefore, the support arms 30b are bent and thereafter the cover portion 30a comes into extensive contact with the tire 14a in a balanced manner. Thus, the tire 14a is rapidly guided in the α direction without much deformation. In addition, the steering plate 31 does not dig into part of the tire 14a or of the wheel 14b.

Even if the tire 14a is slightly deformed, since the opposite cover 30 is supported by the wheel 14b, in the end the front wheel 14 is instantly guided in the α direction.

In this way, the front wheel 14 is forcibly steered and the opposite cover 30 comes into contact with the slant surface 35 at a point P offset leftward from the central axis J. On the other hand, the gravity center G of the entire motorcycle 12 on the central axis is about to move toward the front Fr. In the result, the motorcycle 12 goes toward the arrow β direction offset rightward. The motorcycle 12 undergoes a force so as to be shifted in a generally horizontal plane so that a force adapted to turn the motorcycle in a vertical plane does not virtually occur. Thus, a reaction force applied to the front force 14 in a direction (Rr direction) opposite the vehicle-traveling direction is not applied to the body frame in the same direction (Rr direction). In addition, the transmission of energy is distributed in a time-width where the opposite cover 30 slides on the slant surface 35 so that an impact can significantly be alleviated. Thus, it is believed that the pitching of the motorcycle 12 can be suppressed.

In this case, the front top portion 33 is located further externally with respect to the motorcycle 12 from an extension of a left-right center of the front wheel 14 in the traveling direction thereof when the front wheel 14 is steered to the maximum angle. Thus, for example, even if the front wheel 14 collides with some obstruction during steering to the maximum steering angle (see the two-dot chain lines in FIG. 4A), the front wheel 14 is forcibly steered in the same direction.

In this case, the opposite cover 30 is secured by fastening the support arms 30b to the brake calipers 29L, 29R supported by the respective front forks 28L, 28R. Therefore, even if any one of the front forks 28L, 28R and the head pipe 24 is first deformed, the opposite cover 30 collides with the steering plate 31 which is the projecting portion on the side of the body frame 13. At the time of this collision, since the support arms 30b are first deformed, it is not necessary to allow the cover portion 30a and the support arms 30b to have excessive high-strength. In other words, both the support arms 30b and the cover portion 30a can be made moderately thin and light. In addition, since the opposite cover 30 is disposed at a position lower than the gravity center G of the motorcycle 12, it has a small influence on the so-called under-spring load of the front wheel 14.

The members are set so that the relationship between the friction coefficient μ1 of the front wheel 14 and the friction coefficient μ2 of the opposite cover 30 may be μ1>μ2. Therefore, in the state where the front wheel 14 and the opposite cover 30 are retained with each other, the opposite cover 30 and the front wheel 14 integrally slide against the steering plate 31. Thus, steering can be promoted more rapidly and efficiently.

According to the present embodiment described above, the vehicle structure of the motorcycle includes the body frame 13; the handlebar 18 turnably supported by the body frame 13; the front forks 28L, 28R extending from the handlebar 18 and rotatably supporting the front wheel 14; the steering plate 31 disposed in the front portion of the body frame 13 in the traveling direction of the motorcycle 12 at a position facing the front wheel 14 and provided with the slant surface 35; and the opposite cover 30 supported by the front forks 28L, 28R, covering a rear portion of the front wheel 14 and facing the steering plate 31. Thus, when the motorcycle 12 undergoes the reaction force of the propulsion force from the front thereof, the slant surface 35 of the steering plate 31 and the opposite cover 30 slide against each other so that the front wheel 14 and the opposite cover 30 are guided along the slant surface 35 in the arrow α direction.

In this case, the opposite cover 30 is made of a metal member but it is not limited to the metal member. The opposite cover 30 may be hard and not-splintery one having a friction coefficient smaller than that of the tire 14a. This can promote the rapid steering of the front wheel 14.

The opposite cover 30 has a semi-circular shape in cross-section, is close to the front wheel 14, and is formed circular generally concentrically with the front wheel 14. In addition, the opposite cover 30 has a circular length, i.e., a vehicle height-directional width, greater than that of the slant surface 35. Thus, the opposite cover 30 comes into extensive contact with the tire 14a that has undergone a force from the front to be deformed and distributes the force, thereby preferably suppressing the deformation (misshapenness) of the tire 14a.

When the opposite cover 30 supported by the front forks 28L, 28R via the support arms 30b comes into contact with and slides against the slant surface 35 because of the front wheel 14 undergoing a force from the front to deform the front forks 28L, 28R, the support arms 30 are deformed to allow the opposite cover 30 to come into contact with the front wheel 14. That is to say, since the deformation of the support arms 30b allows the opposite cover 30 to come into contact with the tire 14a, the opposite cover 30 can come into surface-contact with and slide against the tire 14a without allowing the opposite cover 30 to have excessively high strength. This can reduce the weight of the opposite cover 30 so as not to increase the so-called under-spring load of the front wheel 14 so much. Thus, the opposite cover 30 has a small influence on traveling stability and steering performance.

The steering plate 31 has the front top portion 33 in the traveling direction of the motorcycle 12. The front top portion 33 is located externally with respect to the vehicle from the extension, toward the rear in the traveling direction, of the center of the front wheel 14 in the vehicle-width direction thereof when the front wheel 14 is steered to the maximum angle on one side. Thus, even if the front wheel 14 undergoes a force from the front when it is steered to the maximum angle to any side of the left and right sides, the steering of the motorcycle 12 is promoted in the supposed direction.

The opposite cover 30 is supported by the brake calipers 29L, 29R supported by the respective front forks 28L, 28R. Therefore, if the front forks 28L, 28R are bent rearward of the vehicle at a level more than a supposed level and plastically deformed, the opposite cover 30 and the front top portion 33 slide against each other. Thus, even if the motorcycle 12 undergoes the force from the front thereof, the pitching of the vehicle can be suppressed.

Figure 5:
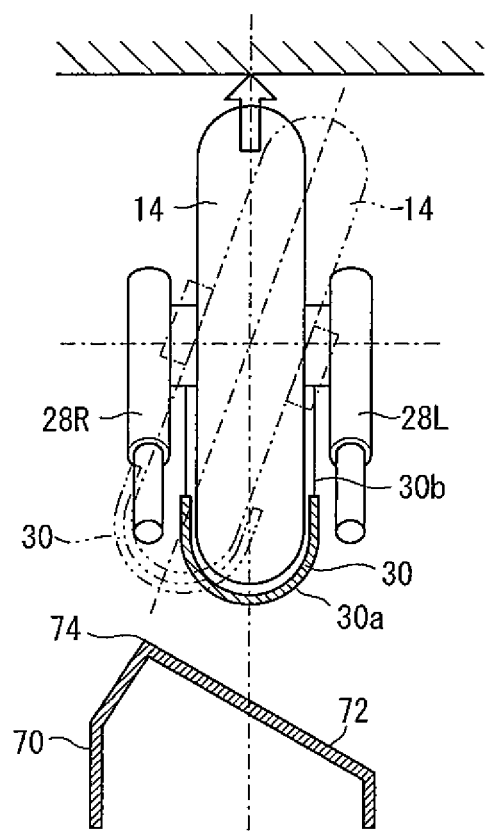
FIG. 5 is a schematic explanatory diagram illustrating a state immediately before a motorcycle will undergo a force from the front, the motorcycle incorporating a body structure of a modification of the first embodiment of the invention.

The displacement direction of the front top portion 33 of the steering plate 31 does not depend on the types of vehicles and vehicle bodies. The front top portion 33 of the steering plate 31 can be provided on any side of the left and right sides. As illustrated in FIG. 5, depending on design conditions, the inclination of a steering plate 70 may be an opposite slant surface 72 and a front top portion 74 may be on the left side.

Second Embodiment

Figure 6:
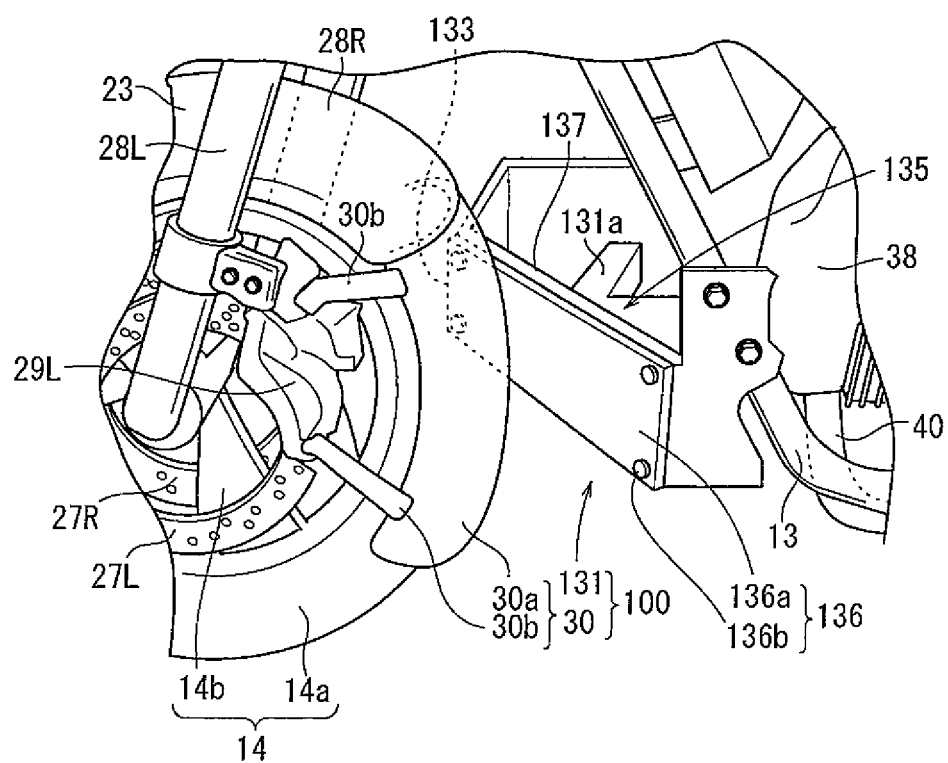
FIG. 6 is a partially-omitted enlarged perspective view enlarging a body structure and its periphery according to a second embodiment of the present invention.

FIG. 6 is a partially-omitted enlarged perspective view of a body structure 100 and its periphery according to a second embodiment of the present invention. Incidentally, the configurations other than those of the body structure 100 of a straddle-ride vehicle on which the body structure 100 of the second embodiment is mounted is the same as those of the straddle-ride vehicle 12 on which the body structure 10 of the first embodiment is mounted. Therefore, like or corresponding elements in the straddle-ride vehicle 12 are denoted with like reference numerals and their detailed explanations are omitted.

Referring to FIG. 6, the body structure 100 of the second embodiment includes an opposite cover 30 covering a rear portion of a front wheel 14; and a steering plate (front wheel guide member) 131 disposed at a front portion of a body frame 13 in a traveling direction of the vehicle and facing the front wheel 14.

An opposite cover 30 is configured in the same manner as the opposite cover 30 of the body structure 10 of the first embodiment.

A steering plate 131 is disposed at a position lower than the gravity center of the motorcycle and includes a front top portion 133 displaced rightward from the central portion and a slant portion 135 extending rearward and leftward from the front top portion 133. The steering plate 131 is a thick and high-strong member and further is reinforced by a reinforcing portion 131a in order to hold the slant portion 135 even if it undergoes a force from the front of the vehicle.

Like the first embodiment, the opposite cover 30 has a width in a vehicle-height direction set to be greater than that of the steering plate 131.

The front top portion 133 is displaced to a position where the steering of the front wheel 14 is promoted in the same direction even if the front wheel 14 undergoes a force from the front of the vehicle when the front wheel 14 is steered at a maximum angle.

The slant portion 135 has a slide promotion mechanism 136 adapted to make smooth the displacement of the opposite cover 30 along the slant portion 135. As illustrated in FIG. 6 in the second embodiment, the slide promotion mechanism 136 includes a plate-like member 136a disposed along the front surface of a main body portion 137 of the slant portion 135; and a plurality of securing portions 136b adapted to secure the plate-like member 136a to the main body portion 137 of the slant portion 135.

Examples of a forming material of the plate-like member 136a include a resin member. In this case, it is preferable to select a resin member, forming the plate member 136a, having slide resistance smaller than that of the main body portion 137 of the slant portion 135.

One of or both of respective sliding surfaces of the plate-like member 136a and the main body portion 137 of the slant portion 135 may be coated with a solid lubricant such as polytetrafluoroethylene or the like. Thus, the sliding resistance may be reduced between the plate-like member 136a and the main body portion 137 of the slant portion 135.

The material, shape, size and the like of the securing portions 136b are set so that the securing portions 136b may be configured to have such a low strength that the securing portions 136b are fractured by the force from the plate-like member 136a when the opposite cover 30 comes into contact with and slides against the plate-like member 136a. Examples of forming materials of such securing portions 136b include a resin member.

The securing portions 136b illustrated in FIG. 6 are fasteners formed as screws threadedly engaged with the main body portion 137 of the slant portion 135. The shaft portion of a screw is passed through the plate-like member 136a and threadedly engaged with the main body portion 137. In addition, the plate-like member 136a is held between the head of the screw and the main body portion 137 to secure the plate-like member 136a to the main body portion 137.

In order to avoid interfere with the opposite cover 30, the securing portions 136b are disposed close to the vehicle width-directional left and right end portions of the slant portion 135.

The securing portion 136b is not limited to one described above. The securing portion 136b may be a pin-like one with a head, which is passed through the plate-like member 136a and forcibly fitted into a pin hole formed in the main body portion 137. Alternatively, the securing portion 136b may be a clip-like one, which elastically grips the main body portion 137 and the plate-like member 136a.

The motorcycle 12, the straddle-ride type vehicle, including the body structure 100 according to the second embodiment is basically configured as described above and a description is next given of the function and effect thereof.

Figure 7A:
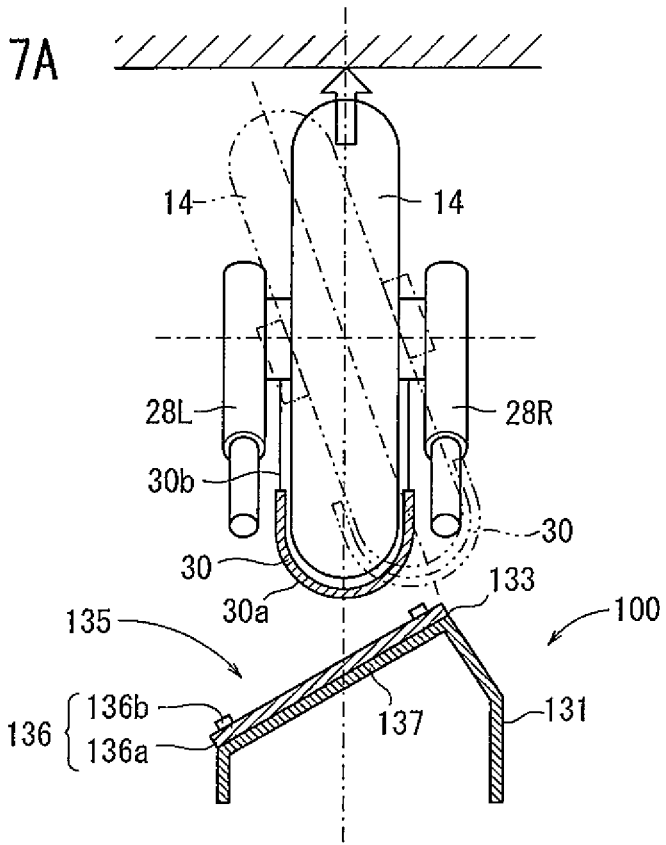
FIG. 7A is a schematic explanatory diagram illustrating a state immediately before a motorcycle will undergo a force from the front, the motorcycle incorporating the body structure of the second embodiment of the invention.
Figure 7B:
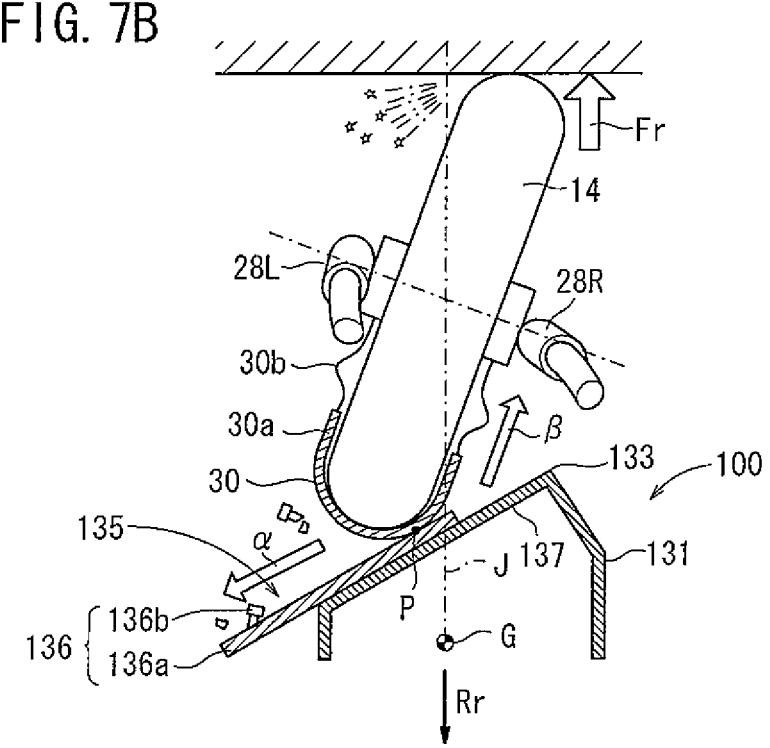
FIG. 7B is a schematic explanatory diagram illustrating a state immediately after the motorcycle has undergone a force from the front, the motorcycle incorporating the body structure of the second embodiment of the invention.

FIG. 7A illustrates a state immediately before the motorcycle will collide with some obstruction and FIG. 7B illustrates a state immediately after the motorcycle has collided with some obstruction.

For example, if it is assumed that the front wheel 14 collides with some obstruction, the front wheel 14 undergoes a reaction force of a propulsion force of the motorcycle 12, indicated with an arrow of FIG. 7A. Then, the reaction force applied to the front wheel 14 bends the front forks 28L, 28R and the head pipe 24 toward the body frame 13.

In this case, if the reaction force is so large as to exceed yield stress of the front forks 28L, 28R or the head pipe 24, the front forks 28L, 28R or the head pipe 24 is plastically deformed and the opposite cover 30 which is a projecting portion collides with the steering plate 131 provided forward of the opposite cover 30. At this time, since the support arms 30b of the opposite cover 30 is deformed, the cover portion 30a comes into contact with the tire 14a while remaining in almost the same shape.

In this case, since the cover portion 30a is at an approximate 40 degrees as viewed from the side, it covers the wide range of the tire 14a. Therefore, the tire 14a is not largely deformed. Thus, time-delay resulting from the deformation of the tire 14a will not occur. In addition, the cover portion 30a is such that the generally central portion in the height direction faces the slant portion 135 of the steering plate 131. Thus, the opposite cover 30 is pressed by the steering plate 131 in a balanced manner.

Since the cover portion 30a is appropriately longer than the slant portion 135 in a height direction, it comes into contact with the steering plate 131 even if the front forks 28L, 28R sinks due to braking operation.

Thereafter, while remaining in contact with the tire 14a, the cover portion 30a slidably contacts the slant portion 135 of the steering plate 131 according to the deformation of the front forks 28L, 28R or the head pipe 24. The cover portion 30a is rapidly and reliably displaced leftward rearward of the vehicle (an arrow α direction of FIG. 7B) while maintaining the integrated state of the front wheel 14 with the opposite cover 30.

In other words, the cover portion 30a of the opposite cover 30 is adequately hard and has a wide area and its height-directional central portion is pressed by the steering plate 131; therefore, the support arms 30b are bent and thereafter the cover portion 30a comes into extensive contact with the tire 14a in a balanced manner. Thus, the tire 14a is rapidly guided in the α direction without much deformation. In addition, the steering plate 131 does not dig into part of the tire 14a or of the wheel 14b.

Even if the tire 14a is slightly deformed, the opposite cover 30 is supported by the wheel 14b. In the end the front wheel 14 is instantly guided in the α direction.

In this way, the front wheel 14 is forcibly steered and the opposite cover 30 comes into contact with the slant portion 135 at a point P offset leftward from the central axis J. On the other hand, the gravity center G of the entire motorcycle 12 on the central axis is about to move toward the front Fr. In the result, the motorcycle 12 goes toward the arrow β direction offset rightward.

As a result of the steering of the front wheel 14, the motorcycle 12 undergoes a force so as to be shifted in a generally horizontal plane so that a force adapted to turn the motorcycle in a vertical plane does not virtually occur. Thus, a reaction force applied to the front wheel 14 in a direction (Rr direction) opposite the vehicle-traveling direction is not applied to the body frame in the same direction (Rr direction). In addition, the transmission of energy is distributed in a time-width where the opposite cover 30 slides on the slant portion 135 so that an impact can significantly be alleviated. Thus, it is believed that the pitching of the motorcycle 12 can be suppressed.

When the front wheel 14 is shifted rearward so that the opposite cover 30 comes into contact with and slides against the slant portion 135, the plate-like member 136a undergoes a force in the arrow α direction due to the friction resistance between the opposite cover 30 and the plate-like member 136a. In this case, since the securing portions 136b securing the plate-like member 136a to the main body portion 137 of the slant portion 135 are set to have moderately low strength, they are fractured by the force applied to the plate-like member 136a in the arrow α direction. Then, the securing of the plate-like member 136a to the main body portion 137 of the slant portion 135 is released so that the plate-like member 136a is slid in the α direction along the main body portion 137 of the slant portion 135. Thus, the guide of the front wheel 14 is promoted obliquely rearward along the slant portion 135 to further promote the steering of the front wheel 14.

In this case, the front top portion 133 is located further externally with respect to the motorcycle 12 from the extension of a left-right center of the front wheel 14 in the traveling direction thereof when the front wheel 14 is steered to the maximum angle. Thus, for example, even if the front wheel 14 collides with some obstruction during steering to the maximum steering angle (see the two-dot chain lines in FIG. 7A), the front wheel 14 is forcibly steered in the same direction.

According to the second embodiment described above, when the straddle-ride vehicle undergoes a force from the front thereof, the opposite cover 30 and the steering plate 131 provided at the end portion of body frame on the traveling directional-side are slid against each other. The front wheel 14 and the opposite cover 30 are guided rearward in the vehicle-traveling direction along the slant portion 135. In this way, the straddle-ride vehicle is forcibly promoted. Thus, it is possible to provide the straddle-ride vehicle that can suppress the pitching thereof even when the vehicle undergoes the force from the front thereof.

According to the second embodiment, the provision of the slide promotion mechanism 136 reduces the slide resistance of the opposite cover 30 relative to the slant portion 135. Therefore, the steering of the front wheel 14 can further be promoted. Thus, when the front wheel 14 undergoes a force from the front there, the pitching of the vehicle can be suppressed more effectively.

Additionally, according to the second embodiment, the slide promotion mechanism 136 is composed of the plate-like member 136a disposed along the front surface of the main body portion 137 of the slant portion 135 and the securing portions 136b. When the front wheel 14 is shifted rearward so that the opposite cover 30 comes into contact with the slant portion 135, the friction resistance between the opposite cover 30 and the slant portion 135 allows the plate-like member 136a to slide against and separate from the main body 137 of the slant portion 135. Therefore, the guide of the wheel is promoted obliquely rearward along the slant portion 135 to further promote the steering of the front wheel 14. Thus, when the front wheel 14 undergoes the force from the front thereof, the front wheel 14 can more rapidly be steered so that the pitching of the vehicle can be suppressed more effectively.

Incidentally, the constituent portions of the second embodiment, common to the first embodiment can obviously provide the functions and effects identical with or similar to those of the first embodiment.

The displacement direction of the front top portion 133 of the steering plate 131 does not depend on the types of vehicles and vehicle bodies. The front top portion 133 of the steering plate 131 can be provided on any side of the left and right sides. Similarly to the modification of the first embodiment illustrated in FIG. 5, depending on design conditions, the inclination of the steering plate 131 may be made opposite, that is, the front top portion 133 may be disposed on the left side.

Third Embodiment

Figure 8:
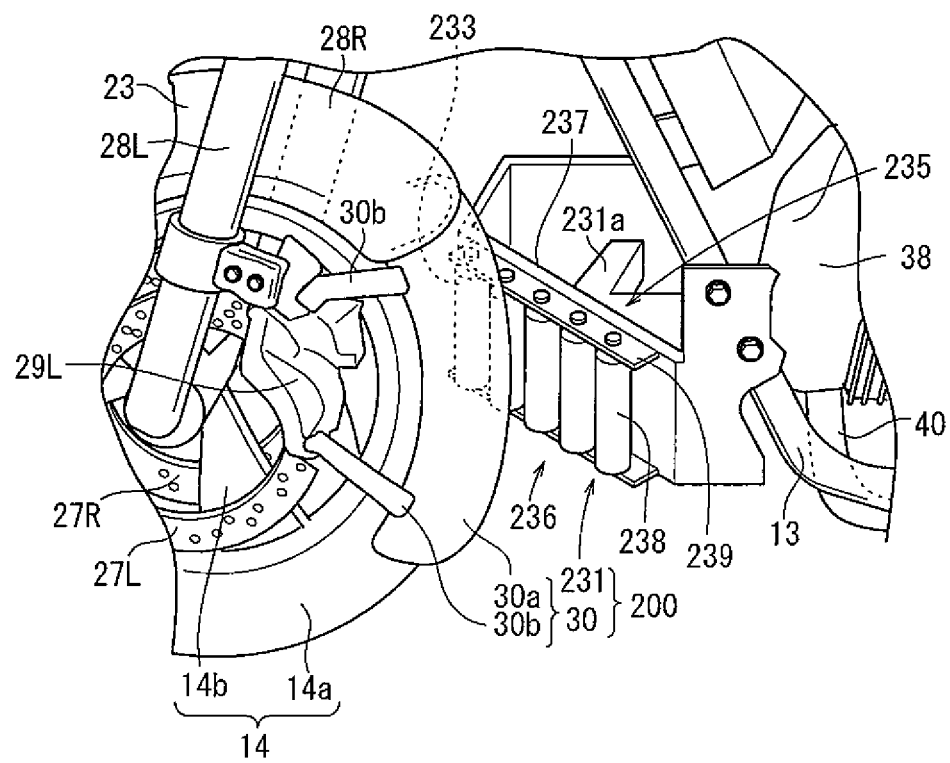
FIG. 8 is a partially-omitted enlarged perspective view enlarging a body structure and its periphery according to a third embodiment of the present invention.

FIG. 8 is a partially-omitted enlarged perspective view of a body structure 200 and its periphery according to a third embodiment of the present invention. Incidentally, the configurations other than those of the body structure 200 of a straddle-ride vehicle on which the vehicle body structure 200 of the third embodiment is mounted is the same as those of the straddle-ride vehicle 12 on which the body structure 10 of the first embodiment is mounted. Therefore, like or corresponding elements in the straddle-ride vehicle 12 are denoted with like reference numerals and their detailed explanations are omitted.

Referring to FIG. 8, the body structure 200 of the third embodiment includes an opposite cover 30 covering a rear portion of a front wheel 14; and a steering plate (front wheel guide member) 231 disposed at a front portion of a body frame 13 in a traveling direction of the vehicle and facing the front wheel 14.

The opposite cover 30 is configured in the same manner as the opposite cover 30 of the body structure 10 of the first embodiment.

The steering plate 231 is disposed at a position lower than the gravity center of the motorcycle and includes a front top portion 233 displaced rightward from the central portion and a slant portion 235 extending rearward and leftward from the front top portion 233. The steering plate 231 is a thick, high-strong member and further is reinforced by a reinforcing portion 231a in order to hold the slant portion 235 even if the vehicle undergoes a force from the front thereof.

Like the first embodiment, the opposite cover 30 has a width in a vehicle-height direction set to be greater than that of the steering plate 231.

The front top portion 233 is displaced to a position where the steering of the front wheel 14 is promoted in the same direction even if the vehicle undergoes a force from the front thereof when the front wheel 14 is steered at a maximum angle.

The slant portion 235 has a slide promotion mechanism 236 adapted to make smooth the displacement of the opposite cover 30 along the slant portion 235.

As illustrated in FIG. 8, the slide promotion mechanism 236 of the third embodiment is composed of a plurality of rollers 238. The plurality of rollers 238 are arranged along the main body portion 237 of the slant portion 235. The rollers 238 are each supported by upper and lower support members 239 secured to the main body portion 237 so as to be rotatable around a vertical axis.

Preferably, the rollers 238 are arranged in a range of almost the full length of the slant portion 235 and have almost the same length as the size of the main body portion 237 in a vehicle-height direction. A diameter of each roller 238 and an arrangement interval between the rollers 238 are set to be such small and narrow that the opposite cover 30 does not dig into the arrangement interval when the opposite cover 30 is pressed against the rollers 238.

The motorcycle, the straddle-ride type vehicle, including the body structure 200 according to the third embodiment is basically configured as described above and a description is next given of the function and effect thereof.

Figure 9A:
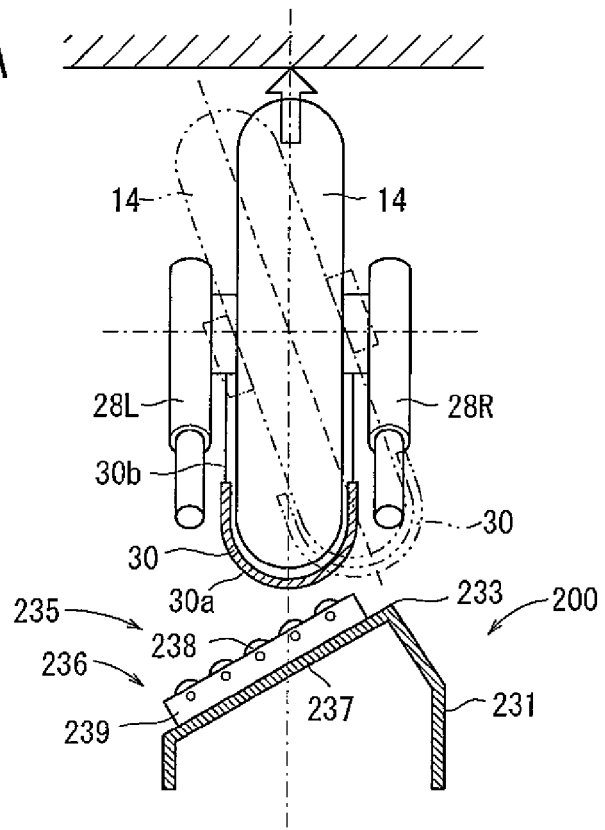
FIG. 9A is a schematic explanatory diagram illustrating a state immediately before a motorcycle will undergo a force from the front, the motorcycle incorporating the body structure of the third embodiment of the invention.
Figure 9B:
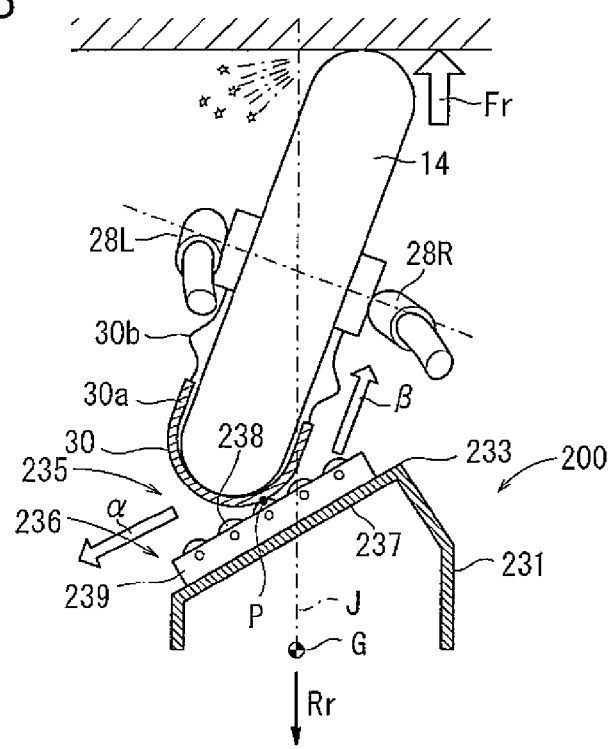
FIG. 9B is a schematic explanatory diagram illustrating a state immediately after the motorcycle has undergone a force from the front, the motorcycle incorporating the body structure of the third embodiment of the invention.

FIG. 9A illustrates a state immediately before the motorcycle will collide with some obstruction and FIG. 9B illustrates a state immediately after the motorcycle has collided with some obstruction.

For example, if it is assumed that the front wheel 14 collides with some obstruction, the front wheel 14 undergoes a reaction force of a propulsion force of the motorcycle 12, indicated with an arrow of FIG. 9A. Then, the reaction force applied to the front wheel 14 bends the front forks 28L, 28R and the head pipe 24 toward the body frame 13.

In this case, if the reaction force is so large as to exceed yield stress of the front forks 28L, 28R or the head pipe 24, the front forks 28L, 28R or the head pipe 24 is plastically deformed and the opposite cover 30 which is a projecting portion collides with the steering plate 231 provided forward of the opposite cover 30. At this time, since the support arms 30b of the opposite arm 30 are deformed, the cover portion 30a comes into contact with the tire 14a while remaining in almost the same shape.

Thereafter, while remaining in contact with the tire 14a, the cover portion 30a comes into contact with the rollers 238 of the slant plate 235 according to the deformation of the front forks 28L, 28R or the head pipe 24. The cover portion 30a is rapidly and reliably displaced leftward rearward of the vehicle (an arrow α direction of FIG. 9B) while maintaining the integrated state of the front wheel 14 with the opposite cover 30.

In other words, the cover portion 30a of the opposite cover 30 is adequately hard and has a wide area and its height-directional central portion is pressed by the steering plate 231; therefore, the support arms 30b are bent and thereafter the cover portion 30a comes into extensive contact with the tire 14a in a balanced manner. Thus, the tire 14a is rapidly guided in the α direction without much deformation. In addition, the steering plate 231 does not dig into part of the tire 14a or of the wheel 14b.

Even if the tire 14a is slightly deformed, the opposite cover 30 is supported by the wheel 14b. In the end the front wheel 14 is instantly guided in the α direction.

In this way, the front wheel 14 is forcibly steered and the opposite cover 30 comes into contact with the rollers 238 at a point P offset leftward from the central axis J. On the other hand, the gravity center G of the entire motorcycle 12 on the central axis is about to move toward the front Fr. In the result, the motorcycle 12 goes toward the arrow β direction offset rightward.

As a result of the steering of the front wheel 14, the motorcycle 12 undergoes a force so as to be shifted in a generally horizontal plane so that a force adapted to turn the motorcycle in a vertical plane does not virtually occur. Thus, a reaction force applied to the front wheel 14 in a direction (Rr direction) opposite the vehicle-traveling direction is not applied to the body frame in the same direction (Rr direction). In addition, the transmission of energy is distributed in a time-width where the opposite cover 30 slides on the slant portion 235 so that also an impact can significantly be alleviated. Thus, it is believed that the pitching of the motorcycle 12 can be suppressed.

In the third embodiment, since the opposite cover 30 is smoothly guided by the rollers 238 in the α direction, the friction resistance of the opposite cover 30 relative to the slant portion 235 can be reduced effectively to further promote the steering of the front wheel 14.

In this case, the front top portion 233 is located further externally with respect to the motorcycle 12 from an extension of a left-right center of the front wheel 14 in the traveling direction thereof when the front wheel 14 is steered to the maximum angle. Thus, for example, even if the front wheel 14 collides with some obstruction during steering to the maximum steering angle (see the two-dot chain lines in FIG. 9A), the front wheel 14 is forcibly steered in the same direction.

According to the third embodiment described above, when the straddle-ride vehicle undergoes a force from the front thereof, the opposite cover 30 and the steering plate 231 provided at the end portion of body frame 13 on the traveling directional-side are slid against each other. The front wheel 14 and the opposite cover 30 are guided rearward in the vehicle-traveling direction along the slant portion 235. In this way, the straddle-ride vehicle is forcibly promoted. Thus, it is possible to provide the straddle-ride vehicle that can suppress the pitching thereof even when it undergoes the force from the front thereof.

According to the third embodiment, the provision of the slide promotion mechanism 236 reduces the slide resistance of the opposite cover 30 relative to the slant portion 235. Therefore, the steering of the front wheel 14 can further be promoted. Thus, when the vehicle undergoes a force from the front thereof, the pitching of the vehicle can be suppressed more effectively.

Additionally, according to the third embodiment, since the slide promotion mechanism 236 is composed of the plurality of rollers 238, slide resistance of the opposite cover 30 relative to the slant portion 235 can be reduced effectively to further promote the steering of the front wheel 14. Thus, when the vehicle undergoes a force from the front thereof, the front wheel 14 can rapidly be steered so that the pitching of the vehicle can be suppressed more effectively.

Incidentally, the constituent portions of the third embodiment, common to the first embodiment can obviously provide the functions and effects identical with or similar to those of the first embodiment.

The displacement direction of the front top portion 233 of the steering plate 231 does not depend on the types of vehicles and vehicle bodies. The front top portion 233 of the steering plate 231 can be provided on any side of the left and right sides. Similarly to the modification of the first embodiment illustrated in FIG. 5, depending on design conditions, the inclination of the steering plate 231 may be made opposite, that is, the front top portion 233 may be disposed on the left side.

Fourth Embodiment

Figure 10:
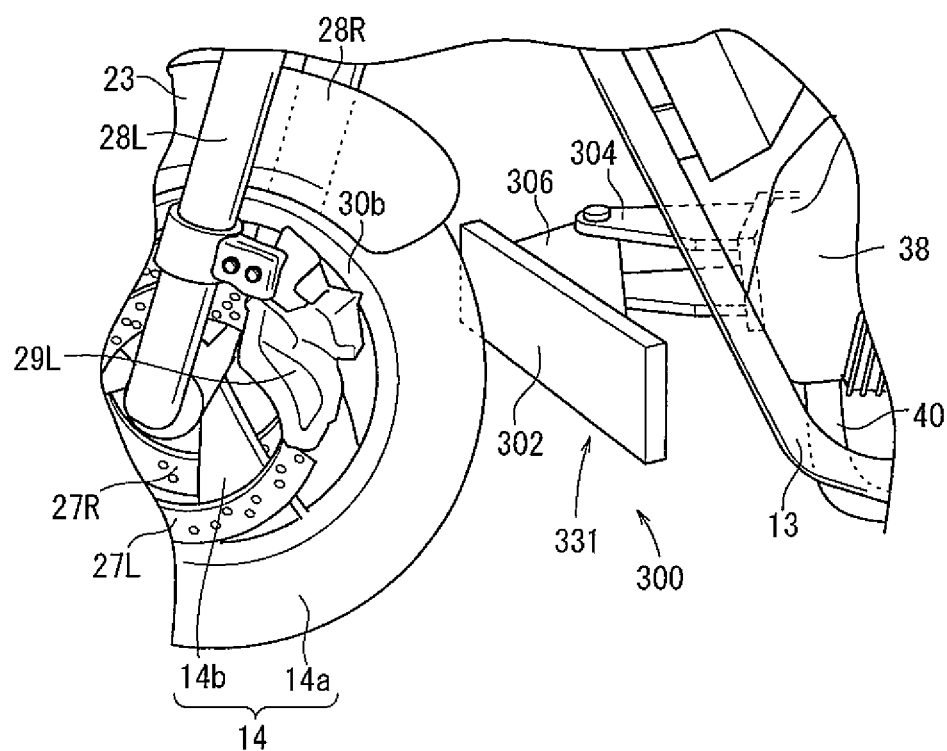
FIG. 10 is a partially-omitted enlarged perspective view enlarging a body structure and its periphery according to a fourth embodiment of the present invention.

FIG. 10 is a partially-omitted enlarged perspective view of a body structure 300 and its periphery according to a fourth embodiment of the present invention. Incidentally, the configurations other than those of the body structure 300 of a straddle-ride vehicle on which the vehicle body structure 300 of the fourth embodiment is mounted are the same as those of the straddle-ride vehicle 12 on which the body structure 10 of the first embodiment is mounted. Therefore, like or corresponding elements in the straddle-ride vehicle 12 are denoted with like reference numerals and their detailed explanations are omitted.

Referring to FIG. 10, the body structure 300 of the fourth embodiment includes a steering plate (front wheel guide member) 331 disposed at a front portion of a body frame 13 in a traveling direction of the vehicle and facing the front wheel 14.

The steering plate 331 is disposed at a position lower than the gravity center of the motorcycle. In addition, the steering plate 331 is pivotally supported by the body frame 13 on one side (on the right side in the configurational example of FIG. 10) of left and right sides in the vehicle-width direction so as to be swingable in the back and forth direction. Further, the steering plate 331 has a guide surface 302 extending in the vehicle-width direction.

A bracket 304 is secured to a front portion of the body frame 13 in the traveling direction at a position facing the front wheel 14 on one side of left and right sides in a vehicle-width direction. An arm 306 is supported by the front end of the bracket 304 so as to be pivotable in the back and forth direction. The steering plate 331 having the above-mentioned guide surface 302 is integrally joined to the arm 306.

The steering plate 331 is held at a waiting position (an initial position) during the normal time when the front wheel 14 does not undergo a force from the front, that is, when the front wheel 14 and the front wheel guide member are spaced apart from each other. This waiting position may be a position where the guide surface 302 is tilted with respect to the back and forth direction of the vehicle as illustrated in FIG. 10. Alternatively, the waiting position may be a position where the guide surface 302 is perpendicular to the back and forth direction of the vehicle.

The arm 306 is coupled to the bracket 304 in the following manner. The arm 306 is not swung by vibration during the traveling of the vehicle or by the inertia force during acceleration or deceleration in the normal time when the front wheel 14 does not undergo the force from the front. On the other hand, the arm 306 is swung rearward by the force applied rearward from the front wheel 14.

For example, the arm 306 may be configured as below. The displacement resistance (rotational resistance) of the arm 306 relative to the bracket 304 is previously set to be large to some degree. When the force applied rearward to the arm 306 via the steering plate 331 exceeds a predetermined level, the arm 306 is displaced (swung) rearward. Alternatively, the arm 306 is previously biased by a biasing member such as a spring so as to hold the steering plate 331 at the waiting position mentioned earlier. When the force applied rearward to the arm 306 exceeds the predetermined level, the arm 306 is swung rearward against the biasing force of the biasing member.

The steering plate 331, the arm 306 and the bracket 304 are set to have thickness and material so that they have such rigidity as not to be largely deformed when undergoing the force from the front.

The steering plate 331 lying at the waiting position extends to a position where the steering of the front wheel 14 is promoted in the same direction, even if it undergoes the force from the front of the vehicle at the time of steering the front wheel 14 at the maximum angle.

The motorcycle 12, the straddle-ride type vehicle, including the body structure 300 according to the fourth embodiment is basically configured as described above and a description is next given of the function and effect thereof.

Figure 11A:
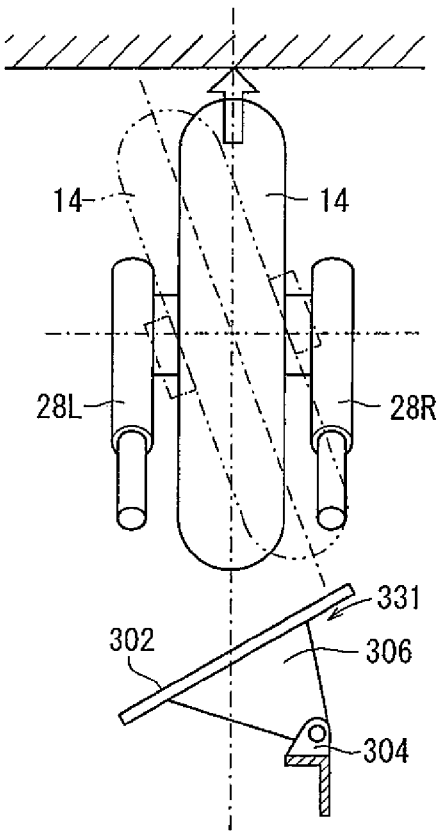
FIG. 11A is a schematic explanatory diagram illustrating a state immediately before a motorcycle will undergo a force from the front, the motorcycle incorporating the body structure of the fourth embodiment of the invention.
Figure 11B:
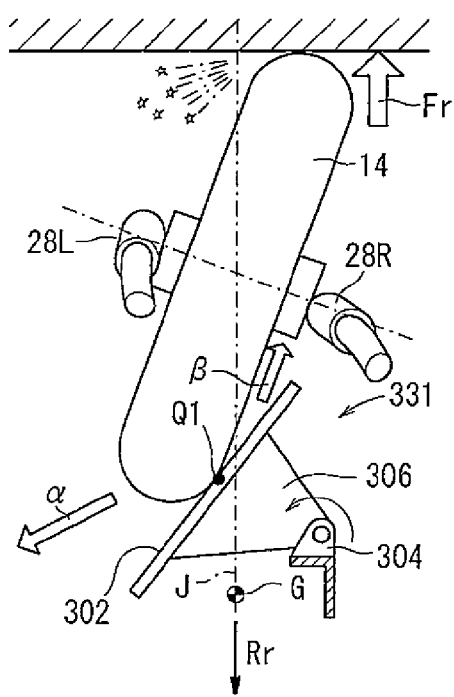
FIG. 11B is a schematic explanatory diagram illustrating a state immediately after the motorcycle has undergone a force from the front, the motorcycle incorporating the body structure of the fourth embodiment of the invention.

FIG. 11A illustrates a state immediately before the motorcycle 12 will collide with some obstruction and FIG. 11B illustrates a state immediately after the motorcycle 12 has collided with some obstruction.

For example, if it is assumed that the front wheel 14 collides with some obstruction, the front wheel 14 undergoes a reaction force of a propulsion force of the motorcycle 12, indicated with an arrow of FIG. 11A. Then, the reaction force applied to the front wheel 14 bends the front forks 28L, 28R and the head pipe 24 toward the body frame 13.

In this case, if the reaction force is so large as to exceed yield stress of the front forks 28L, 28R or the head pipe 24, the front forks 28L, 28R or the head pipe 24 is plastically deformed and the tire 14a collides with the steering plate 331 provided forward of the body frame 13.

Thereafter, the front fork 28L, 28R or the head pipe 24 is further deformed, so that the steering plate 331 is pressed rearward by the tire 14a. Although the steering plate 331 is held at the waiting position during the normal time, when the tire 14a is pressed rearward, this pressing force exceeds the force (rotational resistance, biasing force, etc.) holding the steering plate 331 at the waiting position. Thus, the steering plate 331 begins to swing (turn) rearward.

Then, the front wheel 14 is guided in the arrow α direction along the inclination of the steering plate 331. At the same time, the displacement of the guide surface 302 along with the turning of the steering plate 331 allows the rearward portion of the front wheel 14 in contact with the steering plate 331 to be displaced in the direction (the left direction FIG. 11B) opposite the side where the steering plate 331 is pivotally supported, in the vehicle-width direction.

In the result, the front wheel 14 is guided obliquely rearward along the guide surface 302 by the steering plate 331 while being pressed in the direction opposite the side where the steering plate 331 is pivotally supported, in the vehicle-width direction.

In this way, the front wheel 14 is forcibly steered and the opposite cover 30 comes into contact with the slant surface 302 at a point Q1 offset leftward from the central axis J. On the other hand, the gravity center G of the entire motorcycle on the central axis is about to move toward the front Fr. In the result, the motorcycle goes toward the arrow β direction offset rightward.

As a result of the steering of the front wheel 14, the motorcycle undergoes a force so as to be shifted in a generally horizontal plane so that a force adapted to turn the motorcycle in a vertical plane does not virtually occur. Thus, a reaction force applied to the front wheel 14 in a direction (Rr direction) opposite the vehicle-traveling direction is not applied to the body frame 13 in the same direction (Rr direction). In addition, the transmission of energy is distributed in a time-width where the front wheel 14 slides on the guide surface 302 so that an impact can significantly be alleviated. Thus, it is believed that the pitching of the motorcycle 12 can be suppressed.

In this case, the steering plate 331 extends externally with respect to the motorcycle 12 from an extension of a left-right center of the front wheel 14 in the traveling direction thereof when the front wheel 14 is steered to the maximum angle. Thus, for example, even if the front wheel 14 collides with some obstruction during steering to the maximum steering angle (see the two-dot chain lines in FIG. 11A), the front wheel 14 is forcibly steered in the same direction.

According to the fourth embodiment described above, when the front wheel 14 of the straddle-ride vehicle undergoes the force from the front thereof so that the front forks 28L, 28R are deformed and the front wheel 14 comes into contact with the steering plate 331, the steering plate 331 undergoes the force from the front wheel 14 to be turned rearward. Then, while being pressed by the steering plate 331 in the direction opposite the side where the steering plate 331 is pivotally supported in the vehicle-width direction, the front wheel 14 is guided rearward in the vehicle-traveling direction along the inclination of the steering plate 331. In this way, the steering of the straddle-ride vehicle is forcibly promoted. Thus, it is possible to provide the straddle-ride vehicle that can suppress the pitching thereof even when the vehicle undergoes the force from the front thereof.

According to the fourth embodiment, during the normal time when the front wheel 14 does not undergo a force from front, the steering plate 331 is held at the waiting position. In addition, when the front wheel 14 undergoes a force from the front and comes into contact with and slides against the steering plate 331, the steering plate 331 is turned. Thus, when the front wheel 14 is shifted rearward, the steering of the front wheel 14 can be promoted positively.

Incidentally, the position where the steering plate 331 is pivotally supported does not depend on the types of vehicles and vehicle bodies. The steering plate 331 can be provided on any side of the left and right sides. Depending on design conditions, the steering plate 331 may be disposed left-right oppositely to the arrangement illustrated in FIGS. 11A and 11B, that is, the position where the steering plate 331 is pivotally supported may be set on the left side of the vehicle.

Fifth Embodiment

Figure 12:
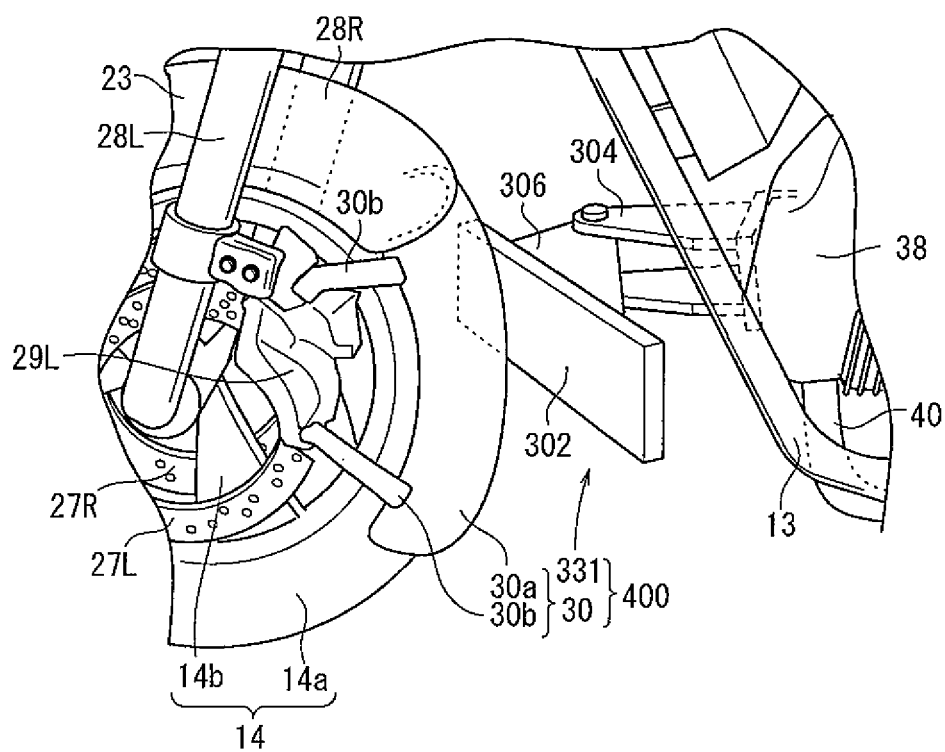
FIG. 12 is a partially-omitted enlarged perspective view enlarging a body structure and its periphery according to a fifth embodiment of the present invention.

FIG. 12 is a partially-omitted enlarged perspective view of a body structure 400 and its periphery according to a fifth embodiment of the present invention. Incidentally, the configurations other than those of the body structure 400 of a straddle-ride vehicle on which the vehicle body structure 400 of the fifth embodiment is mounted is the same as those of the straddle-ride vehicle 12 on which the body structure 10 of the first embodiment is mounted. Therefore, like or corresponding elements in the straddle-ride vehicle 12 are denoted with like reference numerals and their detailed explanations are omitted.

Referring to FIG. 12, the body structure 400 according to the fifth embodiment includes an opposite cover 30 covering a front wheel 14 from rear and a steering plate (front wheel guide member) 331 disposed at a front portion of a body frame in a traveling direction of the vehicle and facing the front wheel 14.

The opposite cover 30 is configured in the same manner as the opposite cover 30 of the body structure 10 according to the first embodiment.

The steering plate 331 is configured in the same manner as that of the body structure 300 according to the fourth embodiment.

The opposite cover 30 has a width in a vehicle-height direction set to be greater than that of the steering plate 331.

The motorcycle, the straddle-ride type vehicle, including the body structure 400 according to the fifth embodiment is basically configured as described above and a description is next given of the function and effect thereof.

Figure 13A:
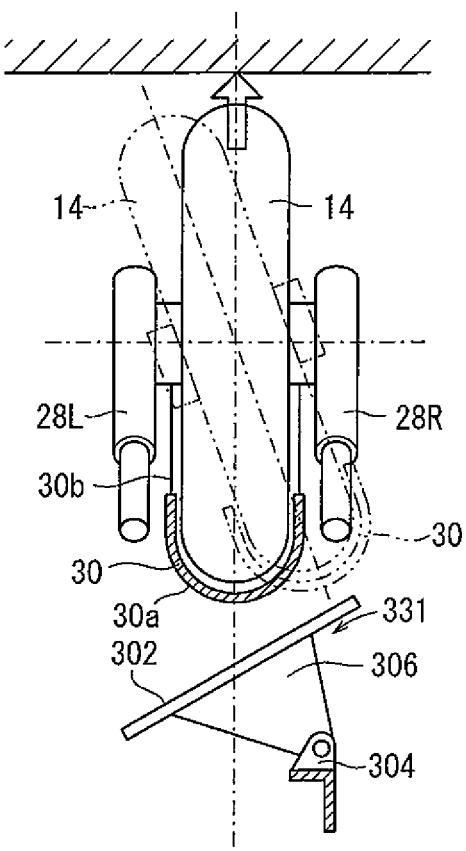
FIG. 13A is a schematic explanatory diagram illustrating a state immediately before a motorcycle will undergo a force from the front, the motorcycle incorporating the body structure of the fifth embodiment of the invention.
Figure 13B:
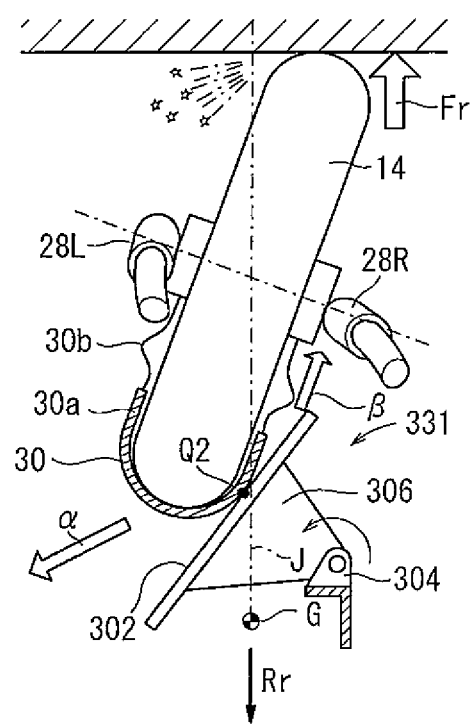
FIG. 13B is a schematic explanatory diagram illustrating a state immediately after the motorcycle has undergone a force from the front, the motorcycle incorporating the body structure of the fifth embodiment of the invention.

FIG. 13A illustrates a state immediately before the motorcycle will collide with some obstruction and FIG. 13B illustrates a state immediately after the motorcycle has collided with some obstruction.

For example, if it is assumed that the front wheel 14 collides with some obstruction, the front wheel 14 undergoes a reaction force of a propulsion force of the motorcycle 12, indicated with an arrow of FIG. 13A. Then, the reaction force applied to the front wheel 14 bends the front forks 28L, 28R and the head pipe 24 toward the body frame 13.

In this case, if the reaction force is so large as to exceed yield stress of the front forks 28L, 28R or the head pipe 24, the front forks 28L, 28R or the head pipe 24 is plastically deformed and the opposite cover 30 collides with the steering plate 331 provided forward of the body frame 13. At this time, since the support arms 30b of the opposite arm 30 is deformed, the cover portion 30a comes into contact with the tire 14a while remaining in almost the same shape.

In the above-mentioned process until the front wheel 14 is shifted rearward and forcibly steered, when the opposite cover 30 collides with the steering plate 331, the support arms 30b of the opposite cover 30 are deformed. Therefore, the cover portion 30a comes into contact with the tire 14a while remaining in almost the same shape.

In this case, since the cover portion 30a is at an approximate 40 degrees as viewed from the side, it covers the wide range of the tire 14a. Therefore, the tire 14a is not largely deformed. Thus, time-delay resulting from the deformation of the tire 14a will not occur. In addition, the cover portion 30a is such that its generally central portion in the height direction faces the slant surface 35 of the steering plate 331. Thus, the opposite cover 30 is pressed by the steering plate 31 in a balanced manner.

Since the cover portion 30a has a height-directional width longer than that of the slant surface 35, it comes into contact with the steering plate 331 even if the front forks 28L, 28R sink due to braking operation.

Thereafter, while remaining the integrated state of the front wheel 14 with the opposite cover 30, the cover portion 30a slidably contacts the slant surface 302 of the steering plate 331 according to the deformation of the front forks 28L, 28R or the head pipe 24.

In other words, the cover portion 30a of the opposite cover 30 is adequately hard and has a wide area and the height-directional central portion is pressed by the steering plate 331; therefore, the support arms 30b are bent and thereafter the cover portion 30a comes into extensive contact with the tire 14a in a balanced manner. Thus, the tire 14a is not deformed so much and the steering plate 331 does not dig into part of the tire 14a or of the wheel 14b, so that the tire 14a begins to be rapidly guided in the α direction without much deformation.

Thereafter, the front fork 28L, 28R or the head pipe 24 are further deformed, and then the steering plate 331 is pressed rearward by the opposite cover. The steering plate 331 is held at the waiting position during the normal time. However, when the steering plate 331 is pressed rearward by the opposite cover 30, this pressing force exceeds the force (rotational resistance, biasing force, etc.) holding the steering plate 331 at the waiting position. Thus, the steering plate 331 begins to swing (turn) rearward.

Then, the front wheel 14 becomes integrated with the opposite cover 30 and is guided in the arrow α direction along the inclination of the steering plate 331. At the same time, the displacement of the guide surface 302 along with the turning of the steering plate 331 allows the opposite cover 30 to be displaced in the direction (the left direction in FIG. 13B) opposite the side where the steering plate 331 is pivotally supported, in the vehicle-width direction.

In the result, the front wheel 14 is guided obliquely rearward along the steering plate 331 while being pressed by the steering plate 331 in the direction opposite the side where the steering plate 331 is pivotally supported, in the vehicle-width direction.

In this way, the front wheel 14 is forcibly steered and the opposite cover 30 comes into contact with the guide surface at a point Q2 offset leftward from the central axis J. On the other hand, the gravity center G of the entire motorcycle 12 is on the central axis and is about to move toward the front Fr. In the result, the motorcycle goes toward the arrow β direction shifted rightward.

As a result of the steering of the front wheel 14, the motorcycle undergoes a force so as to be shifted in a generally horizontal plane so that a force adapted to turn the motorcycle in a vertical plane does not virtually occur. Thus, a reaction force applied to the front wheel 14 in a direction (Rr direction) opposite the vehicle-traveling direction is not applied to the body frame in the same direction (Rr direction). In addition, the transmission of energy is distributed in a time-width where the opposite cover slides on the guide surface 302 so that an impact can significantly be alleviated. Thus, it is believed that the pitching of the motorcycle can be suppressed.

In this case, the steering plate 331 extends further externally with respect to the motorcycle 12 from the extension of a left-right center of the front wheel 14 in the traveling direction thereof when the front wheel 14 is steered to the maximum angle. Thus, for example, even if the front wheel 14 collides with some obstruction during steering to the maximum steering angle (see the two-dot chain lines in FIG. 13A), the front wheel 14 is forcibly steered in the same direction.

According to the fifth embodiment described above, when the front wheel 14 of the straddle-ride vehicle undergoes a force from the front so that the front forks 28L, 28R are deformed and the opposite cover 30 comes into contact with the steering plate 331, the steering plate 331 undergoes the force from the opposite cover 30 to be turned rearward. Then, while being pressed by the steering plate 331 in the direction opposite the side where the steering plate 331 is pivotally supported, in the vehicle-width direction, the front wheel 14 is guided rearward in the vehicle-traveling direction along the inclination of the steering plate 331. In this way, the steering of the straddle-ride vehicle is forcibly promoted. Thus, it is possible to provide the straddle-ride vehicle that can suppress the pitching thereof even when it undergoes the force from the front thereof.

According to the fifth embodiment, during the normal time when the front wheel 14 does not undergo a force from the front, the steering plate 331 is held at the waiting position. In addition, when the opposite cover 30 undergoes a force from the front and comes into contact with and slides against the steering plate 331, the steering plate 331 is turned. Thus, when the front wheel 14 is shifted rearward, the steering of the front wheel 14 can positively be promoted.

According to the fifth embodiment, when the front wheel 14 is shifted rearward, the opposite cover 30 with a small friction coefficient comes into contact with and slides against the steering plate 331. Thus, the steering can be promoted more rapidly and effectively. In addition, the opposite cover 30 is harder and more not-splintery than the tire 14a. Therefore, the opposite cover 30 is not largely deformed when coming into contact with the steering plate 331 and is rapidly guided by the steering plate 331 obliquely rearward. Thus, it is possible to provide the straddle-ride vehicle that can quickly suppress the pitching of the vehicle.

The position where the steering plate 331 is pivotally supported does not depend on the types of vehicles and vehicle bodies. The steering plate 331 can be provided on any side of the left and right sides. Depending on design conditions, the steering plate 331 may be disposed left-right oppositely to the arrangement illustrated in FIGS. 13A and 13B, that is, the position where the steering plate 331 is pivotally supported may be set on the left side of the vehicle.

According to an embodiment of the present invention, when the straddle-ride vehicle undergoes a force from the front thereof, the front wheel guide member provided at the traveling directional-side end portion of the body frame and the opposite cover are slid against each other. Then, the front wheel and the opposite cover are guided along the slant portion rearward in the vehicle traveling direction. In this way, the steering of the straddle-ride vehicle is forcibly promoted. Thus, it is possible to provide the straddle-ride vehicle that suppresses the pitching thereof even when it undergoes a force from the front thereof.

According to an embodiment of the present invention, when the front wheel of the straddle-ride vehicle undergoes a force from the front to deform the front forks so that it comes into contact with the front wheel guide member, the front wheel guide member undergoes the force from the front wheel to be turned rearward. Then, while the front wheel is pressed by the front wheel guide member in a direction opposite the side where the front wheel guide member is pivotally supported, in the vehicle-width direction, it is guided along the inclination of the front wheel guide member toward the rear in the vehicle traveling direction. In this way, the steering of the straddle-ride vehicle is forcibly promoted. Thus, it is possible to provide the straddle-ride vehicle that suppresses the pitching thereof even when the vehicle undergoes a force from the front thereof.

According to an embodiment of the present invention, when the front wheel is shifted rearward, the opposite cover having a small friction coefficient comes into contact with and slides against the steering plate. Therefore, the steering can be promoted more rapidly and efficiently. Thus, it is possible to provide the straddle-ride vehicle that rapidly suppresses the pitching thereof.

According to an embodiment of the present invention, during the normal time when the front wheel does not undergo a force from the front, the front wheel guide member is kept at the waiting position. In addition, when the front wheel undergoes a force from the front and comes into contact with and slides against the front wheel guide member, the front wheel guide member is turned. Thus, when the front wheel is shifted rearward, the steering of the front wheel is reliably promoted.

According to an embodiment of the present invention, during the normal time when the front wheel does not undergo a force from the front, the front wheel guide member is kept at the waiting position. In addition, when the front wheel undergoes a force from the front and the opposite cover comes into contact with and slides against the front wheel guide member, the front wheel guide member is turned. Thus, when the front wheel is shifted rearward, the steering of the front wheel can reliably be promoted.

According to an embodiment of the present invention, since the opposite cover is made of a metal member or a resin member, it has a friction coefficient smaller a friction coefficient of the front wheel and is hard and not-splintery. Therefore, when the vehicle undergoes a force from the front, the opposite cover promotes the rapid steering of the front wheel. Thus, it is possible to provide the straddle-ride vehicle that rapidly suppresses the pitching thereof.

According to an embodiment of the present invention, when the opposite cover comes into contact and slides against the slant portion, the support member is deformed to bring the opposite cover into contact with the front wheel. Therefore, the opposite cover can be slid in surface-contact with the front wheel guide member without allowing the opposite cover and the support member to have excessively high strength. Thus, since the opposite cover can be made light, the so-called under-spring load of the front wheel does not increase so much, whereby traveling stability and steering performance will not lower.

According to an embodiment of the present invention, the front top portion is located externally with respect to the vehicle from an extension, toward the rear in the front wheel-traveling direction, of a center of the front wheel in a vehicle-width direction when the front wheel is steered to a maximum angle on one side. Therefore, when the vehicle undergoes a force from the front, the steering of the vehicle is promoted in the expected direction even if the steering of the handlebar is located at any position. Thus, it is possible to provide the straddle-ride vehicle that rapidly suppresses the pitching thereof when the vehicle undergoes a force from the front.

According to an embodiment of the present invention, if the front forks are bent rearward of the vehicle more than expected, since the opposite cover is disposed at the portions supported by the front forks, the opposite cover and the guide member slide against each other. This promotes the steering of the vehicle in the expected direction. Thus, it is possible to provide the straddle-ride vehicle that suppresses the pitching thereof even when the vehicle undergoes a force from the front.

According to an embodiment of the present invention, the provision of the slide promotion mechanism reduces slide resistance of the opposite cover relative to the slant portion. Therefore, the steering of the front wheel is further promoted. Thus, it is possible to suppress the pitching of the vehicle more effectively even when the vehicle undergoes a force from the front.

According to an embodiment of the present invention, the slide promotion mechanism includes the plate-like member disposed along the front surface of the main body portion of the slant portion and the securing portion. When the front wheel is shifted rearward so that the opposite cover comes into contact with the slant portion, the friction resistance between the opposite cover and the slant portion allows the plate-like portion to slide against and separate from the main body portion of the slant portion. The guide of the wheel is promoted obliquely rearward along the slant portion to further promote the steering of the front wheel. It is possible to more rapidly steer the front wheel when the front wheel undergoes a force from the front. Thus, the pitching of the vehicle can be suppressed more effectively.

According to an embodiment of the present invention, since the plate-like member is composed of a resin member and the main body portion of the slant portion is made of a metal material, the friction resistance between both of them can be reduced to further promote the obliquely rearward guide of the wheel.

According to an embodiment of the present invention, since the slide promotion mechanism is composed of a plurality of rollers, the slide resistance of the opposite cover relative to the slant portion can effectively be reduced to further promote the steering of the front wheel. Therefore, when the front wheel undergoes a force from the front, it is possible to steer the front wheel more rapidly. Thus, the pitching of the vehicle can be suppressed more effectively.

According to an embodiment of the present invention, since the opposite cover has a width in a vehicle-height direction greater than that of the steering plate, it is possible to bring the opposite cover into contact with the steering cover even if the front forks sink due to braking operation. Thus, the front wheel can reliably be steered by the steering plate.

According to an embodiment of the present invention, when the opposite cover is pressed by the steering plate, the opposite cover comes into extensive contact with the tire of the front wheel in a balanced manner. Therefore, the deformation of the tire can be reduced. Thus, the front wheel can rapidly be guided obliquely rearward along the slant portion of the steering plate to further promote the steering.

According to an embodiment of the present invention, since the body structure is located at a position lower than the gravity center of the straddle-ride vehicle in a vehicle-height direction. Therefore, the straddle-ride vehicle suppresses the pitching thereof and lowers the gravity center. Thus, steering stability can be less influenced.

According to the embodiments of the present invention, the body structure of the straddle-ride vehicle has a simple structure, does not require complicate control and is inexpensive; however, when the vehicle undergoes the unexpected excessive force from the front thereof, the front forks are deformed so that the opposite cover comes into contact with and slides against the slant portion or guide surface and is guided to one side of the vehicle-width direction. Therefore, the front wheel is steered positively and rapidly to reduce an input load applied to the body frame from the position lower than the gravity center of the vehicle body. Thus, it is possible to provide the straddle-ride vehicle that can suppress pitching.

While the present invention is described above taking the preferred embodiments, it is not limited to the embodiments. The invention can obviously be modified in various ways in a range not departing from the gist of thereof. The present invention is highly effective particularly in the straddle-ride vehicles mounted with an airbag; however, it is not limited to the straddle-ride vehicles mounted with an airbag but can obviously be used in various straddle-ride type vehicles.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A body structure of a straddle-ride vehicle comprising:
   a body frame;
   a handlebar turnably provided on the body frame;
   a front fork extending from the handlebar and rotatably supporting a front wheel;
   a front wheel guide member disposed at a front portion of the body frame in a traveling direction of the vehicle and facing the front wheel, the front wheel guide member comprising a slant portion extending from one side of the vehicle to another side of the vehicle in a vehicle-width direction and from a front to a rear in the traveling direction, the front wheel guide member further comprising a reinforcing portion configured to reinforce the slant portion; and
   an opposite cover supported by the front fork to cover a rear portion of the front wheel and facing the front wheel guide member, the opposite cover comprising a cover portion that is longer than the slant portion in a vehicle-height direction,
   wherein the slant portion includes an inclined surface inclined with respect to a central axis of the vehicle when viewed from above the vehicle, the central axis extending in the traveling direction of the vehicle,
   wherein the inclined surface includes a first end portion on the one side of the vehicle and a second end portion located at a forward-most position on the front wheel guide in the traveling direction, the inclined surface extending from the first end portion at the one side of the vehicle across the central axis to the second end portion on the another side of the vehicle, and
   wherein a first distance in the vehicle-width direction from the central axis to the second end portion is greater than a second distance in the vehicle-width direction from the second end portion to an outer-most side of the front wheel guide on the another side of the vehicle in the vehicle-width direction.

2. The body structure of the straddle-ride vehicle according to claim 1, further comprising:
   an opposite cover supported by the front fork to cover a rear portion of the front wheel and facing the front wheel guide member, the opposite cover having a friction coefficient smaller than a friction coefficient of the front wheel.

3. The body structure of the straddle-ride vehicle according to claim 1,
   wherein the opposite cover comprises at least one of a metal member and a resin member.

4. The body structure of the straddle-ride vehicle according to claim 1,
   wherein the opposite cover is attached to the front fork via a support member, and
   wherein when the front wheel undergoes a force from the front so that the front fork is deformed and the opposite cover comes into contact with the slant portion and slides against the slant portion, the support member is deformed to bring the opposite cover into contact with the front wheel.

5. The body structure of the straddle-ride vehicle according to claim 1,
wherein, when the front wheel is steered to a maximum angle on one side, the second end portion is located externally, with respect to the vehicle, from an extension of a center of the front wheel, in the vehicle-width direction, toward the rear.

6. The body structure of the straddle-ride vehicle according to claim 1,
wherein the opposite cover is supported by the front fork via a plurality of support members.

7. The body structure of the straddle-ride vehicle according to claim 1,
wherein the slant portion has a slide promotion mechanism adapted to make a smooth displacement of the opposite cover along the slant portion.

8. The body structure of the straddle-ride vehicle according to claim 7,
wherein the slide promotion mechanism includes a plate-like member disposed along a front surface of a main body portion of the slant portion and a securing portion adapted to secure the plate-like member to the main body portion of the slant portion, and
wherein when the opposite cover comes into contact with the slant portion and slides against the slant portion, securing of the plate-like member by the securing portion is released so that the plate-like member slides against the main body portion.

9. The body structure of the straddle-ride vehicle according to claim 8,
wherein the plate-like member comprises a resin member, and
wherein the main body portion of the slant portion comprises a metal material.

10. The body structure of the straddle-ride vehicle according to claim 7,
wherein the slide promotion mechanism comprises a plurality of rollers.

11. The body structure of the straddle-ride vehicle according to claim 1,
wherein the opposite cover has a width in the vehicle-height direction greater than a width of the front wheel guide member in the vehicle-height direction.

12. The body structure of the straddle-ride vehicle according to claim 1,
wherein the opposite cover has a circular arc shape in cross-section and is shaped like a circular arc as viewed from a side.

13. The body structure of the straddle-ride vehicle according to claim 1,
wherein the opposite cover is located at a position lower than a gravity center of the straddle-ride vehicle in the vehicle-height direction.

14. The body structure of the straddle-ride vehicle according to claim 1,
wherein the front wheel guide member is located at a position lower than a gravity center of the straddle-ride vehicle in the vehicle-height direction.

15. The body structure of the straddle-ride vehicle according to claim 1,
wherein the slant portion is a planar slant surface.

16. The body structure of the straddle-ride vehicle according to claim 1,
wherein the second end portion is located outside, in the vehicle-width direction, an entirety of the front wheel when the front wheel is oriented along the central axis of the vehicle.

* * * * *